United States Patent [19]
Blide et al.

[11] Patent Number: 5,992,134
[45] Date of Patent: Nov. 30, 1999

[54] WALK BEHIND LAWN MOWER WITH BROADCAST SPREADER ATTACHMENT

[76] Inventors: Daniel J. Blide, P.O. Box 549, Long Valley, N.J. 07853; Frank C. Brodeen, 132 Oakdale Rd., Chester, N.J. 07930

[21] Appl. No.: 09/003,631

[22] Filed: Jan. 7, 1998

[51] Int. Cl.⁶ .............................. A01C 17/00; A01D 19/00
[52] U.S. Cl. ........................ 56/16.8; 56/DIG. 5; 239/663
[58] Field of Search ........................ 56/168, 202, DIG. 5; 111/130; 239/289, 661, 663, 670, 687–689

[56] References Cited

U.S. PATENT DOCUMENTS

| | | | |
|---|---|---|---|
| Re. 32,067 | 1/1986 | Emory | 56/16.8 |
| D. 359,963 | 7/1995 | Pink et al. | D15/17 |
| 2,573,784 | 11/1951 | Asbury | 275/8 |
| 2,847,224 | 8/1958 | Stout | 275/8 |
| 2,966,023 | 12/1960 | Carpenter | 56/16.8 X |
| 3,375,644 | 4/1968 | Harper | 56/16.8 X |
| 3,405,514 | 10/1968 | Pulrang | 56/16.8 |
| 3,758,967 | 9/1973 | Thompson | 37/43 E |
| 3,882,615 | 5/1975 | Williams | 37/43 L |
| 4,327,541 | 5/1982 | Emory | 56/16.8 |
| 4,807,904 | 2/1989 | Kamlutin et al. | 56/DIG. 5 X |
| 5,385,306 | 1/1995 | Cervenka | 239/663 |
| 5,485,963 | 1/1996 | Walto et al. | 239/663 |

*Primary Examiner*—Robert Pezzuto
*Attorney, Agent, or Firm*—Kenneth P. Glynn, Esq.

[57] ABSTRACT

The present invention is a walk behind segmented interchangeable lawn mower with spreader device having a main housing with rear wheels, a handle and a motor and having interchangeable second and third housings for attaching a spreader attachment, wherein the spreader attachment is capable of spreading material over an area, and attaching a mower cutting blade attachment. In one embodiment the present invention includes a second housing having a rotatable cutting blade for cutting grass and the like. In another embodiment, the present invention includes a third housing which preferably includes a hopper which extends upwardly from the housing. The hopper includes an open top and an open bottom, sidewalls and, preferably, an indented area which includes a plurality of apertures for permitting the flow of material therethrough. A flow rate adjusting handle member is also included. The hopper also includes a vertically disposed rod member having a vertical rotation axis. The rod member includes a plurality of mixing members and a spreader member.

20 Claims, 3 Drawing Sheets

WALK BEHIND LAWN MOWER WITH BROADCAST SPREADER ATTACHMENT

BACKGROUND OF THE INVENTION

1. Field of the Invention

The present invention is directed to walk behind mower devices with spreaders, and more particularly to walk behind, segmented, interchangeable lawn mower with broadcast spreader devices.

2. Information Disclosure Statement

Conventional lawn mowers and spreaders come in a variety of shapes and sizes and function in a number of ways. Yet none of the prior art examples disclose an interchangeable, replaceable, walk behind mower and spreader device. The following patents represent the present state of the art.

U.S. Pat. No. 2,847,224 to Alden Stout teaches a combined spreader and mower. The spreader has a wheeled frame, a power source on the frame for driving a cutting blade and a rotatable plate simultaneously. The rotatable plate has flanges thereon and is mounted under a hopper having a discharge spout wherein material is discharged therefrom and spread over an area.

U.S. Pat. No. 4,327,541 to Edward P. Emory; Reissued U.S. Pat. No. 32,067 to Edward P. Emory, describes a universal spreader comprising a hopper; a cable by which the spreading of fertilizer/chemical/seed/pesticide/etc., in the hopper may be initiated or terminated; a rotatable, driven agitator; a series of moveable fertilizer delivery tubes or "fingers" for delivering the fertilizer from the hopper to the ground which allows spreader to be fit on lawn mowers of most sizes with handles of different and varied configurations; and a guide securing device which also assists in spreading the fertilizer from the "fingers" while also serving to provide a base for anchoring and adjusting the width of the "fingers" to coincide with the swath of the lawn cut by the blades of the mower. Two additional, accessory devices include handle lock to prevent forward and rearward motion of the lawn mower handle and a temporary, wheel contacting, mounting tool to assist the user in mounting and attaching the hopper unto the lawn mower in a one man operation.

U.S. Design Pat. No. 359,963 to Anthony N. Pink et al. discloses an ornamental design for a granular fertilizer spreader attachment for a lawn mower.

U.S. Pat. No. 2,573,784 to Charles T. Asbury describes a dispensing device with a generally horizontally disposed fan housing, a vertical shaft extending into housing and an impeller on the shaft in the housing, the impeller having a back plate adjacent to the upper wall of the housing and fan blades dependent therefrom, the upper wall of the housing being formed with a central opening coaxial with the shaft, a hopper mounted in the opening and a feed pin eccentrically mounted on the shaft and extending through the opening into the hopper, a plurality of air inlet apertures in the upper wall of the housing disposed about the opening and adjacent the periphery of the back plate, and a peripheral discharge opening in the housing, the inlet openings and discharge opening being screened.

U.S. Pat. No. 3,758,967 to David R. Thompson describes a self-propelled wheel mounted yard maintenance apparatus carrying an engine to drive the unit and a working element which may be a sweeper brush, a snowplow, a lawn mower or the like. The working element is direct-connected to the engine and is adapted to be rotated to function as the apparatus is moved across a yard. The apparatus includes a pair of drive wheels mounted upon a shaft to rotate to propel the unit. A differential is carried upon a driven shaft connected to the engine and a driving shaft connected to the drive wheel shaft. The differential is free to rotate upon these shafts and when rotating freely, it does not apply any driving torque to the driving shaft. A brake is provided to reduce the rate of rotation of this differential or to stop its rotation completely and in either case, the braking action will impart driving torque to the driving shaft. The driving shaft rotates in a direction opposite to the driven shaft when so restrained by the brake. The working element may rotate in a direction opposite to the direction of rotation of the drive wheels or in the same direction of rotation by the addition of reversing gears in the mechanisms between the engine and the working element.

U.S. Pat. No. 3,882,615 to Larry W. Williams shows a snow-moe structure which can be used for cutting grass during one season of the year and for removing snow during another season of the year. The snow-moe includes a wheeled power housing having spaced apart wheels supported at the ends of the axle shafts secured to the housing and upon which is secured a power unit having a power drive member extending forwardly therefrom to engage one of a plurality of adapter units to be connected to and driven by the power housing. In one instance the adapter unit can take the form of a snow blower which has an elongated channel receiving member to be fastened to the wheeled power housing and fixedly secured thereto by vertical bolts passing through the channel and engaging the adapter unit. In another form, the adapter can be a rotary lawn mower which is secured to the power drive unit substantially in the same manner, i.e., having an elongated channel member engaging the channel of the wheeled power housing and secured thereto with vertical depending bolts or the like. The engine drive shaft is in a horizontal plane and the adapter unit has a splined coupling shaft also positioned in a horizontal plane to be connected with a power coupling unit extending from the horizontal drive shaft of the power drive unit.

U.S. Pat. No. 5,385,306 to Joseph Cervenka teaches a spreader attachable to a lawn mower, having a hopper, an adjustable orifice at the bottom of the hopper and a rotating regulator for dispensing granular material behind the lawn mower. In one embodiment, a first sprocket attached to the wheel of the lawn mower, and a second sprocket attached to the spreader device receive a chain for driving the rotating regulator of the spreader.

U.S. Pat. No. 5,485,963 to Joseph J. Walto et al. describes a granular fertilizer spreader which may be attached to a lawn mower. The spreader includes a hopper which is secured to the mower handle, the spreader including drive wheels which frictionally engage the rear mower wheels. An impeller is rotated by the drive wheels, thereby urging fertilizer or other granular material contained within hopper to exit through a series of orifices located along the bottom surface of the hopper. A discharge chute entrains the fertilizer as it exits the orifices and guides the fertilizer along a series of open channels, each channel terminating with an outlet orifice through which the fertilizer is ultimately deposited upon the ground behind the mower deck. The drive wheels are urged into positive frictional contact with the mower wheels by a spring that is secured to the mower handle at a user selected point by a clamp.

Notwithstanding the prior art in this field, it is believed that the present invention, which comprises an a walk behind, segmented, interchangeable lawn mower and broadcast spreader device, as described herein, is neither taught nor rendered obvious.

SUMMARY OF THE INVENTION

The present invention is a walk behind segmented lawn mower with spreader device having a main housing with rear wheels, a handle and a motor and having interchangeable second and third housings for attaching a spreader attachment, wherein the spreader attachment is capable of spreading material over an area, and for attaching a cutting blade mower attachment. In one embodiment the present invention main housing includes a second housing having a rotatable cutting blade for cutting grass and the like. In another embodiment, the present invention main housing includes a third housing which preferably includes a hopper which extends upwardly from the housing. The hopper includes an open top and an open bottom, sidewalls and, preferably, an indented area which includes a plurality of apertures for permitting the flow of material therethrough. A flow rate adjusting handle member is also included. The hopper also includes a vertically disposed rod member having a vertical rotation axis. The rod member includes a plurality of mixing members and a spreader member.

BRIEF DESCRIPTION OF THE DRAWINGS

The present invention will be more fully understood when the specification herein is taken in conjunction with the drawings appended hereto, wherein.

DETAILED DESCRIPTION OF THE PRESENT INVENTION

The present invention is a walk behind segmented, interchangeable lawn mower with broadcast spreader device having a main housing with rear wheels, a handle and a motor and having interchangeable second and third housings for attaching a spreader device, wherein the spreader attachment is capable of spreading material over an area, and attaching a cutting blade mower device. In one embodiment the present invention main housing includes a second interchangeable housing having a rotatable cutting blade for cutting grass and the like. In another embodiment, the present invention main housing includes a third interchangeable housing which preferably includes a hopper which extends upwardly from the housing. The hopper includes an open top and an open bottom, sidewalls and, preferably, an indented area which includes a plurality of apertures for permitting the flow of material therethrough. The hopper may be constructed of any suitable material known to be used within the art, including but not limited to metal, plastic, composite materials and any combinations thereof. The hopper has at least one sidewall. What is meant by sidewall is any number of shapes which define a sidewall, such as an extended circular sidewall, a plurality of linear sidewalls, i.e. squarelike shaped sidewalls, or otherwise. The third housing itself may, likewise, be constructed of any suitable material known to be used in the art without exceeding the scope of the present invention.

A flow rate adjusting handle member is also included with the third housing. The adjusting handle is preferably attached to the hopper at the indented portion and is movable between a closed and open position so as to open and close apertures located within the hopper, thereby permitting and restricting the flow of material through the hopper. The hopper also includes a vertically disposed rod member having a vertical rotation axis. The rod member includes a plurality of mixing members and a spreader member and also includes means for functionally linking the rod member to the motor. In other words, the present invention spreader rod member is drivably rotatable with respect to the motor which drives the rod member.

Figure 1:
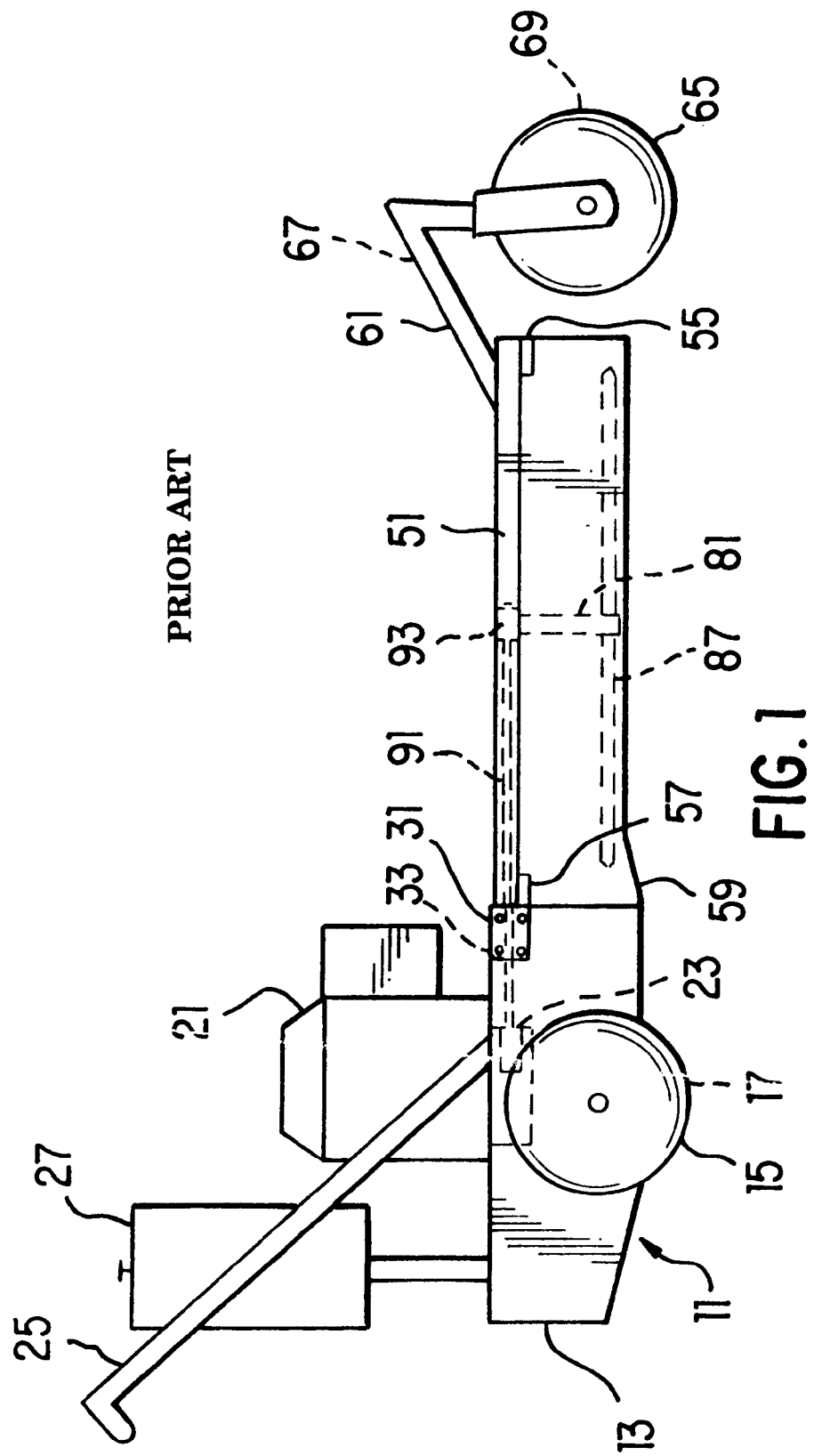
FIG. 1 shows a side view of a conventional prior art walk behind mower device.

Referring now to FIG. 1, a conventional walk behind mower 11 is shown. The prior art mower includes main housing 13 which is fixedly attached to cutting blade support housing 51. Main housing 13 includes motor 21, wheels 15 and 17, gas tank 27 and handle 25. Cutting blade support housing 51 includes wheel mounts 61 and 67, wheels 65 and 69 and has protective shroud 59 which is attached to cutting blade support housing 51 by attachment members 55 and 57. Rotatable blade member 81 has cutting blades 87 and is attached to cutting blade support housing 51. Cutting blade member 81 is functionally linked to motor 21 by lending means 91. Lending means 91 is disclosed as a belt member which is attached at one end to pulley 93, as shown, and which is attached to motor linkage means 23 at its other end. Thus motor 21 drivably powers blades 87 so as to permit the blades to cut grass and the like. Main housing 13 as presently disclosed within the known art is not meant to be separated from cutting blade support housing 51 and is thus fixedly and permanently attached thereto at mounting points 31 and 33.

It has been discovered that mounting points 31 and 33 coincidentally may be re-fashioned to define break-away points to permit the interchangeability and replacement of cutting blade support housing 51 with broadcast spreader housing 151. Thus, the present invention improves the conventional prior art by offering an improved walk behind, segmented, interchangeable lawn mower and broadcast spreader device which allows the replacement of a cutting blade support housing with a spreader housing and vice versa.

Figure 2:
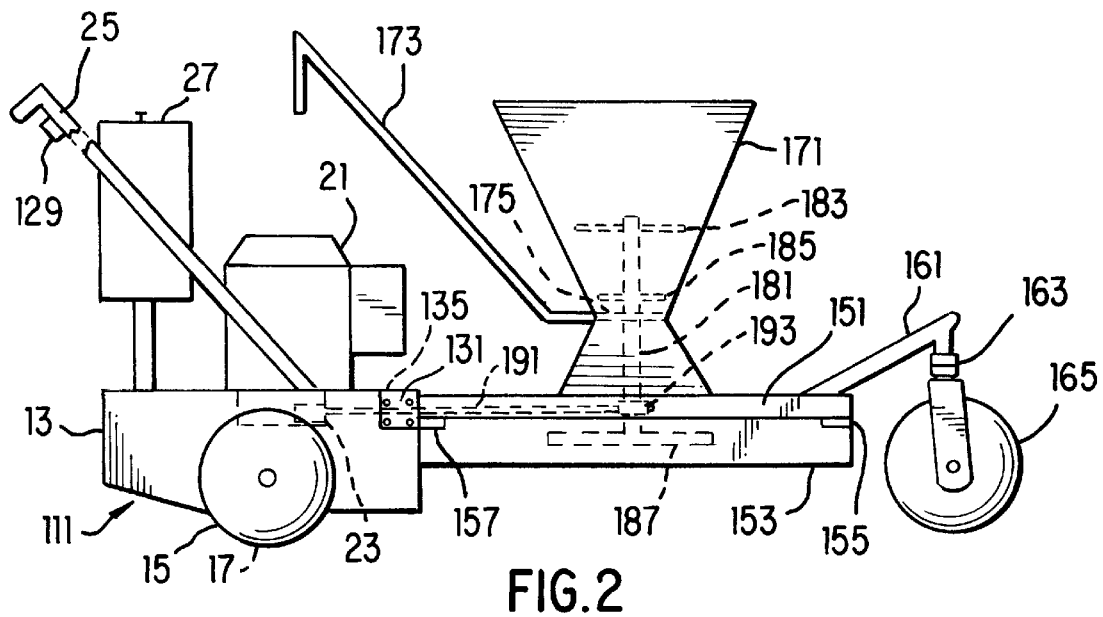
FIG. 2 shows a side view of a present invention walk behind segmented, interchangeable lawn mower and broadcast spreader device.
Figure 3:
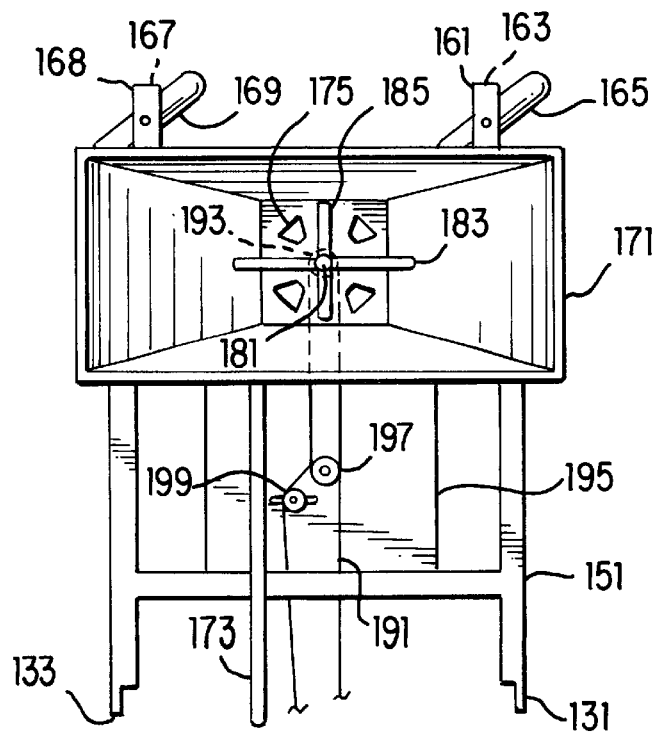
FIG. 3 shows a top view a present invention spreader device for use with the present invention walk behind, segmented, interchangeable lawn mower device as shown in FIG. 2.

Referring to FIGS. 2 and 3, a present invention walk behind segmented, interchangeable lawn mower and broadcast spreader device 111 is shown. It should be noted that identical parts are identically numbered with respect to FIGS. 1 through 3 for illustrative purposes. Here main housing 13 is detachably mounted spreader housing 151 at mounting points 131 and 133. Mounting points 131 and 133 are detachable members which may be removably fixed to main housing 13 by any conventional means, such as screws, clamps, bolts, snaps, quick releases, pinching members and otherwise. It is to be understood that mounting points 131 and 133 are to be easily released and easily locked so as to permit the simple replacement of one housing with the other. As shown here, spreader housing 151 includes wheel supports 161 and 168. Wheel supports 161 and 168 include castors 163 and 167 which permit the adjustable positioning of wheels 165 and 169. While FIGS. 2 and 3 show a pair of wheels, it should be understood that any number of wheels may be employed, i.e. 1,2,3,4,5,6, etc., without exceeding the scope of the present invention. Spreader housing 151 includes shroud 153 which is attached to spreader housing 151 by attachment members 155 and 157. It should be noted that shroud member 153 is shown for illustrative purposes only and is not necessary in terms of functionality. As shown, hopper 171 is attached to spreader housing 151. Hopper 171 is shown with an open top and open bottom. Hopper 171 is, accordingly, capable of holding any material suitable for spreading upon an open area surface, including, for example, but not limited to seeds, fertilizer, insect repellant, rocks, salt, sand, woodchips and otherwise. Hopper 171 is shown having a rectangular shape, but it should be understood that any shape and dimension may be employed without exceeding the scope of the present invention. As shown here, hopper 171 includes an indented portion. The indented portion includes apertures 175 which permit a material contained in hopper 171 to flow therethrough. Flow rate control handle 173 is attached to hopper 171 at a point corresponding to the indented portion, such that it is movable between an open and closed position. When flow rate control handle 173 is moved into an open position, apertures 175 are opened, thereby permitting material to flow therethrough. When flow rate control handle 173 is moved into a closed position, apertures 175 are closed, thereby restricting material from flowing therethrough. It should be noted that the length, width, shape and exact dimensions of apertures 175 and flow rate control handle 173 are merely illustrative and may vary greatly within the scope of the present invention. Centrally located and attached within hopper 171 is vertical elongated rod member 181. Elongated rod member 181 is vertically rotatable within hopper 171. Rod member 181 includes mixing members 183 and 185 and has spreader member 187. Spreader member 187 may vary in construction and may be, for example, including but not limited to, a disk, a plurality of blades, a plurality of fins or otherwise. Thus, when material is placed into the top of hopper 171, it is mixed and churned by mixing members 183 and 185 so as to prevent blockage and build-up and so as to permit easy flow of material through apertures 175. Spreader member 187 broadcasts material upon a surface of an area by virtue of its rotation about rod 181. Thus, when the present invention is in use, rod member 181 rotates, thereby mixing, and spreading material simultaneously. As shown here, motor 21 has linkage means 23 which is functionally connected to belt members 191. Belt members 191 are connected to pulleys 197 and 193 so as to permit motor 21 to drivably power rod 181 about its axis. Here, pulley 197 and tension member 199 are situated upon platform member 195. Tension member 199 is adjustable so as to increase and decrease tension as shown. It should be understood, however, that the exact number of pulleys and belts may widely vary without exceeding the scope of the present invention. It should also be understood that platform 195, as shown, is merely illustrative and many other suitable belt and pulley configurations may be employed without exceeding the scope of the present invention. In addition, handle 25, as shown here, includes control member 129. Control member 129 permits a user to manually adjust the speed of rotation of rod 181 and to permit the self-propulsion of the walk behind segmented mower. Thus, control member is functionally attached to motor 21 so as to permit adjustment of broadcast distance and self propulsion of the present invention. Control members such as control member 129 are widely known within the art and may thus vary within the known scope of such art.

Figure 4:
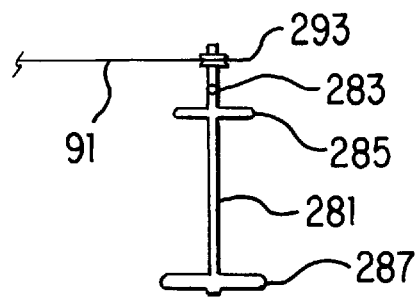
FIG. 4 shows a side view of an alternative embodiment rotatable rod member with mixing members and spreading member, illustrating details thereof.
Figure 5:
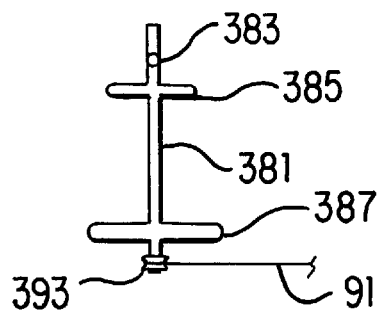
FIG. 5 shows a side view of another alternative embodiment rotatable rod member with mixing members and spreading member, illustrating details thereof.

Likewise, referring to FIGS. 4 and 5, the positioning of belt members 91 may vary without exceeding the scope of the present invention. As shown in FIG. 4, rod member 281 has spreading member 287 and mixing members 283 and 285. Here, pulley 293 is located above mixing members 283 and 285. As shown in FIG. 5, rod member 381 has spreading member 387 and mixing members 383 and 385. Here, pulley 393 is located below spreader member 387.

Figure 6:
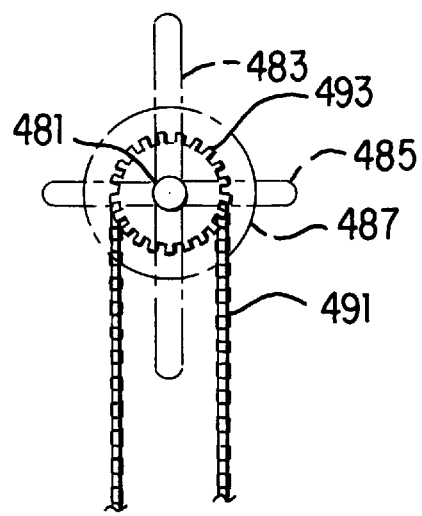
FIG. 6 shows a top view of another alternative embodiment rotatable rod member with mixing members and spreading member, illustrating details thereof.
Figure 7:
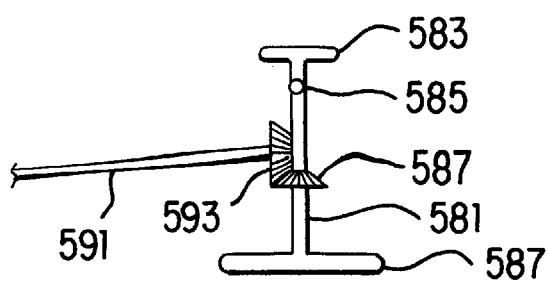
FIG. 7 shows a side view of an alternative embodiment rotatable rod member with mixing members and spreading member, illustrating details thereof.

Furthermore, it is not necessary that the present invention utilize belts as linkage members. The present invention may employ chains and chain gears, drive shafts and drive gears and any combination of belts, chains, chain gears, drive shafts and otherwise. Thus, as shown in illustrative detail in FIG. 6, rod member 481 includes mixing members 483 and 485 and includes spreader member 487. Here chain member 491 is attached to chain gear 493. Referring to FIG. 7, rod member 581 includes mixing members 583 and 585 and includes spreader member 587. Here shaft member 591 includes gear 593 which engages gear 587 as shown. Thus, the present invention linkage means may vary widely within the art in terms of construction, location and configuration without exceeding the scope of the present invention.

Obviously, numerous modifications and variations of the present invention are possible in light of the above teachings. It is therefore understood that within the scope of the appended claims, the invention may be practiced otherwise than as specifically described herein.

What is claimed is:

1. A walk behind, segmented, interchangeable lawn mower and broadcast spreader device, comprising:
   a first main housing having a motor, rear wheels and a handle, said motor including means for functionally linking said motor to each of a rotatable cutting blade member and a rotatable spreading member, said main housing having means for mounting interchangeable, detachable second and third housings thereto;
   wherein said second interchangeable, detachable housing includes:
      front wheels attached to said second housing; a rotatable cutting blade member;
      means for functionally linking said rotatable cutting blade member to said motor functional linking means; and
      means for mounting said second housing to said main housing;
   wherein said third interchangeable, detachable housing includes:
      front wheels attached to said third housing;
      means for spreading a material upon an area below said third housing, said spreader means including a hopper connected to said third housing, said hopper having an open top and an open bottom and having sidewalls, said hopper having means for permitting the flow of material therethrough, said hopper having means for controlling the rate of flow of material therethrough, said hopper having means for spreading material therefrom;
      means for functionally linking said spreading means to said motor functional linking means; and means for mounting said third housing to said main housing.

2. The lawn mower and broadcast spreader device of claim 1 wherein said material spreading means includes a vertically disposed rod member located inside said hopper and having a central vertical axis for rotation thereabout, said rod member having a plurality of mixer members thereon, said mixing members being rotatable about said central vertical axis, said rod member having at least one spreader member connected thereto, said spreader member being rotatable about said central vertical axis.

3. The lawn mower and broadcast spreader device of claim 2 wherein each of said hopper sidewalls have an inward inclination toward an indented portion of said hopper, said indented portion including a plurality of apertures capable of permitting the flow of a material therethrough and wherein said flow rate controlling means is an elongated movable handle member movably connected to said hopper and capable of opening and closing said apertures.

4. The lawn mower and broadcast spreader device of claim 1 wherein said main housing comprises means for providing self-propulsion of said lawn mower and broadcast spreader device, said self-propulsion means being functionally drivable from said motor.

5. The lawn mower and broadcast spreader device of claim 1 wherein each of said second and said third housings comprise castors.

6. The lawn mower and broadcast spreader device of claim 1 wherein each of said second and said third housings comprise at least one depending shroud.

7. The lawn mower and broadcast spreader device of claim 1 further comprising at least one belt and at least two pulleys, wherein said belt and pulleys are capable of functionally linking said motor linkage means to each of said rotatable cutting blade member and said spreading means.

8. The lawn mower and broadcast spreader device of claim 7 including means for adjusting tension of said belt.

9. The lawn mower and broadcast spreader device of claim 1 further comprising at least one chain and at least one chain gear, wherein said chain and chain gear are capable of functionally linking said motor linkage means to each of said rotatable cutting blade member and said spreading means.

10. The lawn mower and broadcast spreader device of claim 1 further comprising at least one drive shaft, wherein said drive shaft is capable of functionally linking said motor linkage means to each of said rotatable cutting blade member and said spreading means.

11. The lawn mower and broadcast spreader device of claim 1 wherein said functional linking means is a connection member selected from the group consisting of belts, pulleys, chains, chain gears, drive shafts and combinations thereof.

12. The lawn mower and broadcast spreader device of claim 1 wherein said second housing mounting means and third housing mounting means include a plurality of mounting bolts.

13. The lawn mower and broadcast spreader device of claim 2 further comprising at least one belt and at least two pulleys, wherein said belt and pulleys are capable of functionally linking said motor linkage means to each of said rotatable cutting blade member and said rotatable spreading member.

14. The lawn mower and broadcast spreader device of claim 13 wherein said belt is attached to said rod member at an area defined below said mixer members and above said spreader member.

15. The lawn mower and broadcast spreader device of claim 13 wherein said belt is attached to said rod member at an area defined above said mixer members and above said spreader member.

16. The lawn mower and broadcast spreader device of claim 13 wherein said belt is attached to said rod member at an area defined below said mixer members and below said spreader member.

17. In a walk behind segmented lawn mower device having a main housing, including rear wheels, a motor and a handle, and a second housing, including a rotatable cutting blade member and means for functionally linking said blade member to said motor, the improvement which comprises:
    a third interchangeable, detachable housing being a replacement for said second housing, said third housing including:
        front wheels attached to said third housing;
        means for spreading a material upon an area below said third housing, said spreader means including a hopper connected to said third housing, said hopper having an open top and an open bottom and having sidewalls, said hopper having means for permitting the flow of material therethrough, said hopper having means for controlling the rate of flow of material therethrough, said hopper having means for spreading material therefrom;
        means for functionally linking said spreading means to said motor; and
        means for mounting said third housing to said main housing.

18. The lawn mower and broadcast spreader device of claim 17 wherein said material spreading means includes a vertically disposed rod member located inside said hopper and having a central vertical axis for rotation thereabout, said rod member having a plurality of mixer members thereon, said mixing members being rotatable about said central vertical axis, said rod member having at least one spreader member connected thereto, said spreader member being rotatable about said central vertical axis.

19. A walk behind segmented interchangeable lawn mower and broadcast spreader device comprising:
    a main housing having a motor, rear wheels and a handle, said motor including means for functionally linking said motor to each of a rotatable cutting blade member and a rotatable spreading member, said main housing having means for mounting interchangeable, detachable second and third housings thereto;
    wherein said second interchangeable detachable housing includes:
        wheels attached to said second housing;
        castors;
        a rotatable cutting blade member;
        means for functionally linking said rotatable cutting blade member to said motor functional linking means; and
        means for mounting said second housing to said main housing;
    wherein said third interchangeable, detachable housing includes:
        wheels attached to said third housing;
        castors;
        means for spreading a material upon an area below said third housing, said spreader means including a hopper connected to said third housing, said hopper having an open top and an open bottom and having a plurality of sidewalls, each of said hopper sidewalls having an inward inclination toward an indented portion, said indented portion including a plurality of apertures capable of permitting the flow of a material therethrough, said hopper having means for controlling the rate of flow of material therethrough, said hopper having means for spreading material therefrom;

means for functionally linking said spreading means to said motor functional linking means; and means for mounting said third housing to said main housing.

20. The lawn mower and broadcast spreader device of claim 19 wherein said lawn mower and broadcast spreader device includes means for adjusting the rotational velocity of said cutting blade member and said spreading means.

\* \* \* \* \*